(12) United States Patent
Shepherd

(10) Patent No.: US 7,771,601 B1
(45) Date of Patent: Aug. 10, 2010

(54) TREATMENT OF WASTE SLUDGE WITH RECYCLING

(76) Inventor: Samuel L. Shepherd, 11411 Squiredale, Houston, TX (US) 77070

( * ) Notice: Subject to any disclaimer, the term of this patent is extended or adjusted under 35 U.S.C. 154(b) by 241 days.

(21) Appl. No.: 11/971,078

(22) Filed: Jan. 8, 2008

Related U.S. Application Data

(63) Continuation-in-part of application No. 11/273,681, filed on Nov. 14, 2005, now abandoned.

(51) Int. Cl.
*C02F 11/14* (2006.01)
(52) U.S. Cl. .................. 210/750; 210/764; 210/765; 210/766; 210/768
(58) Field of Classification Search .................. 210/752
See application file for complete search history.

(56) References Cited

U.S. PATENT DOCUMENTS

| | | | |
|---|---|---|---|
| 4,306,978 A | 12/1981 | Wurtz | |
| 4,781,842 A | 11/1988 | Nicholson | |
| 4,902,431 A | 2/1990 | Nicholson | |
| 5,043,081 A * | 8/1991 | Colin | 405/129.3 |
| 5,635,069 A | 6/1997 | Boss et al. | |
| 5,868,942 A | 2/1999 | Boss et al. | |
| 6,056,880 A | 5/2000 | Boss et al. | |
| 6,214,064 B1 | 4/2001 | Boss et al. | |
| 6,297,246 B1 * | 10/2001 | Sato et al. | 514/254.02 |

* cited by examiner

*Primary Examiner*—Peter A Hruskoci
(74) *Attorney, Agent, or Firm*—Egbert Law Offices PLLC

(57) ABSTRACT

A process for treating a sludge of biological solids has the steps of mixing an oxide-containing chemical with a pozzolanic material, reacting the mixture with the sludge so as to elevate a temperature of the sludge to between 40° C. and 140° C., pressurizing the blended sludge to a pressure of greater than 14.7 p.s.i.a., recycling a portion of the reacted sludge so as to increase a solids content of the sludge, and discharging at least a portion of the pressurized mixed sludge. The step of discharging includes flashing the pressurized mixed sludge across a restricting orifice so as to cause the liquid component to be evaporated.

6 Claims, 1 Drawing Sheet

TREATMENT OF WASTE SLUDGE WITH RECYCLING

CROSS-REFERENCE TO RELATED U.S. APPLICATIONS

The present application is a continuation-in-part of U.S. application Ser. No. 11/273,681, filed on Nov. 14, 2005, entitled "RECYCLING METHOD OF TREATING WASTE SLUDGE WITH POZZALANIC MATERIAL", now abandoned.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to processes for treatment of waste sludges. More particularly, the present invention relates to processes that render biological waste sludges as pathogen-free, vector-free and sellable. Additionally, the present invention relates to waste treatment processes that utilize oxide-containing chemicals and pozzolanic materials for elevating the temperature of the mixed sludge and includes steps that pressurize the mixed sludge.

2. Description of Related Art Including Information Disclosed Under 37 CFR 1.97 and 37 CFR 1.98

In the past, various techniques have been developed for the purpose of sterilizing or decontaminating biological sludges and wastes. The most common process is the process of mixing lime with the sludge. The reaction of lime with the water in the sludge serves to elevate the temperature of the sludge for a maximum of 100° C.

U.S. Pat. Nos. 4,781,842 and 4,902,431, issued to Nicholson, teach a process to decontaminate wastewater sludge to a level that meets or exceeds U.S. EPA process standards. The process mixes sludge with an alkaline material sufficient to raise the pH of the end product to 12 or higher for at least one day. This process will raise the temperature to 50° C., but will not sterilize the sludge, nor does it eliminate the pathogenic microorganisms.

U.S. Pat. No. 4,306,978, issued to Wurtz, relates to a process of lime stabilization of wastewater treatment plant sludge. This patent discloses the dewatering of the sludge and intimately mixing calcium oxide to raise the temperature so as to produce a stabilized sludge particle.

None of these prior art inventions are capable of achieving temperatures, when mixed the sludge, of greater than 100° C. None of these prior art techniques allow for the shorter drying times as required by 40 C.F.R. Subchapter O, Part 503.32 a.311.A-D. The shorter drying times, as required by this Subchapter, are in accordance with the following formula:

$$D = 131,700,000/(1 \times 10^{**}0.14t) \qquad (1)$$

where D=time in days
t=temperature in degrees Celsius

In the past, various patents have issued relating to process for treating a waste sludge of biological solids. The present inventor is an inventor of each of these prior process. For example, U.S. Pat. No. 5,635,069, issued on Jun. 3, 1997, describes a process for treating a waste sludge of biological solids that includes the steps of mixing the sludge with an oxide-containing chemical and sulfamic acid so as to elevate a temperature of the sludge, pressurizing the mixed sludge to a pressure of greater than 14.7 p.s.i.a. and discharging the pressurized mixed sludge. The oxide-containing chemical can be either calcium oxide, potassium oxide, or potassium hydroxide. The sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure.

U.S. Pat. No. 5,868,942, issued on Feb. 9, 1999, teaches a process for treating a pathogen-containing sludge of biological solids which includes the steps of mixing the sludge with calcium oxide, ammonia and carbon dioxide so as to elevate a temperature of the mixed sludge to between 50° C. and 140° C. and which elevates a pH of the mixed sludge to greater than 9.8. The process also includes the steps of pressurizing the mixed sludge to a pressure of greater than 14.7 p.s.i.a. and discharging the pressurized mixed sludge. Ammonia is added to the sludge in the form of either ammonia gas, ammonium hydroxide, ammonium bicarbonate or as a byproduct of the reaction of the calcium oxide with the water in the sludge. Carbon dioxide is added to the sludge in the form of carbon dioxide gas or a reactant of ammonium bicarbonate. The pressurized mixed sludge is discharged by flashing the sludge across a restricting orifice and by evaporating a liquid component of the flashed sludge.

U.S. Pat. No. 6,056,880, issued on May 2, 2000, describes another process for treating a waste sludge of biological solids. This process includes the steps of blending the sludge with an acid, mixing an oxide-chemical with the blended sludge so as to cause a reaction which elevates a temperature of the sludge, pressurizing the mixed sludge to a pressure of greater than 14.7 p.s.i.a. and retaining the mixed sludge at such pressure for a period of time of no less than 15 seconds. The pressurized mixed sludge is then discharged. The step of pressurizing is accomplished by passing the mixed sludge as a flow into the pipe. The pipe has a length and diameter such that the flow of the mixed sludge takes longer than 15 seconds to pass through the pipe. The mixed sludge is heated as the flow passes through the pipe. An immersion heater or a magnetic field is installed so as to apply heat directly to the mixed sludge as the mixed sludge passes through the pipe.

U.S. Pat. No. 6,214,064, issued on Apr. 10, 2001, describes a process for making a fuel product by blending a sewage sludge with an acid, mixing an oxide-containing chemical with the blended sludge so as to cause a reaction which elevates a temperature of the sludge, pressurizing the mixed sludge to a pressure of greater than 14.7 p.s.i.a. for a period of time of no less than 15 seconds, mixing the pressurized mixed sludge with coal fines, and solidifying the mixture of pressurized mixed sludge and coal fines. The oxide-containing chemical is either calcium oxide or calcium hydroxide. The acid is sulfamic acid.

It is an object of the present invention to provide a process for rendering a biological waste sludge pathogen-free and vector-free.

It is another object of the present invention to provide a process that converts the biological waste sludge into a sellable end product.

It is still a further object of the present invention to provide a process that eliminates or reduces waste incineration and landfilling of waste sludges.

It is another object of the present invention to provide a process that eliminates the odors resulting from lime stabilization.

It is still a further object of the present invention to provide a process that facilitates the dewatering of the biological sludge.

It is still another object of the present invention to provide a process that recycles waste heat.

It is still a further object of the present invention to provide a process for treating waste sludges that is cost effective, easy to use, and easy to install.

These and other objects and advantages of the present invention will become apparent from a reading of the attached specification and appended claims.

BRIEF SUMMARY OF THE INVENTION

The present invention is a process for treating a sludge of biological solids that includes the steps of: (1) mixing the sludge with an oxide-containing chemical and a pozzolanic material; (2) reacting the mixture with the sludge so as to elevate a temperature of the sludge to between 40° C. and 140° C.; (3) pressurizing the blended sludge to a pressure of greater than 14.7 p.s.i.a.; (4) recycling a portion of the reacted sludge so as to increase a solids contend of the sludge; and (5) discharging at least a portion of the pressurized mixed sludge into a flashing chamber having a pressure of less than 14.7 p.s.i.a.

In the process of the present invention, the oxide-containing chemical selected from the group consisting of calcium oxide, potassium oxide, potassium hydroxide, sodium hydroxide, aluminum, silicates and iron oxide derivatives. The pozzolanic material is selected from the group consisting of aluminum, silicates and iron oxide derivatives. The iron oxide derivatives can include the ferrous, ferrite and ferrate forms thereof. The oxide-containing chemical is mixed with the sludge in an amount of between 2 and 150 weight percent of the sludge.

In the present invention, the sludge has a water content of between 2 and 99%. The discharging includes the step of either flashing the pressurized mixed sludge across a restricting orifice or passing the pressurized mixed sludge into a chamber having a lower pressure than the pressure of the pressurized mixed sludge. Any vapor component can be condensed therefrom into a liquid.

DETAILED DESCRIPTION OF THE INVENTION

Figure 1:
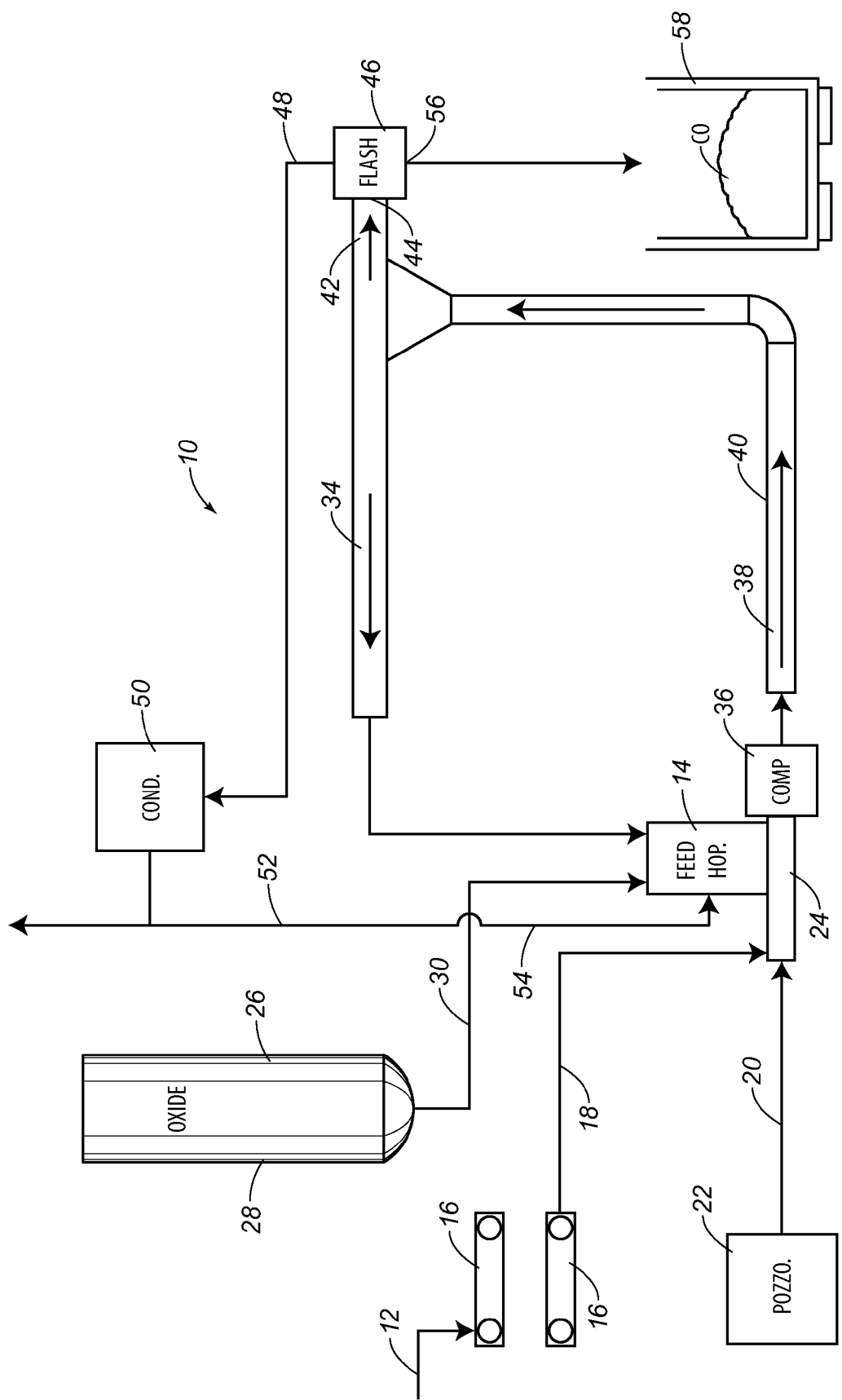
FIG. 1 is a schematic illustration of the process of the present invention.

Referring to FIG. 1, there is shown the process 10 for the treatment of a waste sludge of biological solids in accordance with the preferred embodiment of the present invention. In the process 10 of the present invention, the sludge 12 is delivered together into a feed hopper 14. Piping system 16, along with lines 18, can be used so as to deliver the pressurized sludge to the feed hopper 14. In the concept of the present invention, the sludge 12 is a waste sludge. This sludge includes sewage sludges or animal feces. The sludge 12 will have a water content of between 2% and 99%. It is important for the mixture of sludge 12 to have a combined water content so that the remaining chemicals can properly react with the sludge.

After the sludge 12 is added into the feed hopper 14, the pozzolanic material 20 is delivered from a pozzolanic material storage chamber 22 to the feed hopper 14. A screw conveyor is used in the feed hopper 14 during the transport of the mixture of the sludge 12 and pozzolanic material 20. The screw conveyor mixes the sludge 12 and the pozzolanic material 20.

The feed hopper 14 includes a feed section 24. At the feed section 24, oxide-containing chemicals 26 are added to the feed section 24. In particular, the oxide-containing chemical is stored in a chamber 28 and is passed along line 30 to the feed hopper 14. Feed hopper 14 is mounted directed over the feed section 24.

As used in the present invention, the oxide-containing chemical can be either calcium oxide, potassium oxide, potassium hydroxide, or sodium hydroxide, aluminum, silicates, or iron oxide derivatives including the ferrous, ferrite and ferrate forms thereof, singly or in combination. In the preferred embodiment of the present invention, the oxide-containing chemical 26 should be a mixture of calcium oxide and iron oxide derivatives. Other ingredients, including a recycle stream 34, can be added to the feed section 24, if desired. These other ingredients can be passed along with the oxide-containing chemical 26 or otherwise delivered into the feed section 24. These materials are then transported to a compression zone 36. This compression zone serves to increase the pressure of the mixed sludge to the desired value. Specifically, the compression zone 36 should increase the pressure of the mixed sludge to a pressure of greater than 14.7 p.s.i.a. Experimentation has found that the desired effects of the present invention are achieved by pressurizing the mixed sludge to a pressure of between 14.7 p.s.i.a. and 3000 p.s.i.a.

The adding of the calcium oxide to the mixture and the increasing of the pressure causes an exothermic reaction along the reaction section 38. The combination of the calcium oxide, iron oxide derivatives and the water within the waste sludge produces $Ca(OH)_2$ and liberates 235 Kcal/mole of heat. This raises the temperature from ambient to 100° C.

The time of this reaction can be carried out for a period of time greater than seven minutes. The material which exits the compression zone 36 enters an insulated reaction chamber 40. The reaction chamber 40 contains static mixing elements. The material is continuously disinfected as it progresses through the predetermined length of pipe. The material is continuously under pressure so as to prevent a premature flashing of the water. If flashing would occur, then the water content of the sludge 12 would decrease during this stage and could cause the solidification of the sludge 12 within the chamber 40. A temperature monitor and a pressure monitor are provided along the reaction chamber 40 so as to provide monitoring of the reaction process and to provide for suitable reaction control systems.

After reacting, the material is split into a recycle stream 34 and the sterilized sludge stream 42. A discharge opening 44 is provided in the form of an opening, a die, or a valve. The opening 44 will communicate with a flash chamber 46. As such, the material is delivered under pressure to the opening 44 and then released into the flash chamber 46. A vapor, including water vapor, $NH_3$, $SO_2$ and $SO_3$, can exit the flash chamber 46 through the vent 48. This vapor will then pass through a condenser, or a compressor, and be either reintroduced to the process through line 52 or into the feed hopper 14 by line 54. The reintroduction of such vapor can add nutrient value to the material.

The present invention utilizes recycling to increase solids in the sludge. An increase in the recirculation rate causes the reactor inlet temperature to increase. This causes a net decrease in lime usage. An increase in the recirculation rate increases the a water removal rate which increases the overall percentage of solids in the discharge.

In order to properly remove the water from the sludge, it is important that the flash chamber 46 has an interior pressure of between 0 and 14.7 p.s.i.a. As such, when the mixed sludge passes through the orifice 44, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps, or vapor compressors. After the sludge passes into the flash chamber 46, the resulting sludge will be a sterile, decontaminated product which is pathogen-free and vector-free. This product will meet or exceed U.S. EPA standards.

The sterilized sludge then exits the flash chamber 46 through the discharge opening 56. The resulting sterilized sludge can then disposited into another hopper 58 in the form of a pile of material 60. This pile of material 60 can be either packaged or hauled to a disposal site. The sterilized sludge 60 can be applied to land as a soil conditioner and as a fertilizer supplement. Potassium oxide, potassium hydroxide, or any other soil conditioning materials, can be added to the sludge such that the added material does not hinder the reaction.

The geometric configuration of the reaction chamber 40 is, of course, dependent upon the layout configuration of the facility in which it is used. The reaction chamber 40 may be insulated so as to eliminate heat loss and to produce an adiabatic reaction.

The foregoing disclosure and description of the invention is illustrative and explanatory thereof. Various changes in the details of the described process can be made within the scope of the appended claims without departing from the true spirit of the invention. The present invention should only be limited by the following claims and their legal equivalents.

I claim:

1. A process for treating a sludge of biological solids comprising:
    mixing the sludge with an oxide-containing chemical and a pozzolanic material, said oxide-containing chemical selected from the group consisting of calcium oxide, potassium oxide, potassium hydroxide, sodium hydroxide and iron oxide;
    reacting the mixture in a reaction chamber so as to elevate a temperature of the sludge to between 40° C. and 140° C.;
    pressurizing the mixture in said reaction chamber to a pressure of greater than 14.7 p.s.i.a.;
    splitting the reacted and pressurized mixture into a recycle stream and a sterilized sludge stream;
    passing said recycle stream to said reaction chamber so as to increase a solids content and a temperature of the mixed sludge in said reaction chamber; and
    flashing said sterilized sludge stream across a resisting orifice into a flashing chamber so as to cause a liquid component to be evaporated, said flashing chamber having a pressure of less than 14.7 p.s.i.a, the discharging producing a pathogen-free and vector-free sludge product.

2. The process of claim 1, the sludge having a water content of between 2 and 99%.

3. The process of claim 1, said oxide-containing chemical being mixed with the sludge in an amount of between 2 and 150 weight percent of the sludge.

4. The process of claim 1, said step of flashing producing a vapor component, the process further comprising:
    condensing the evaporated liquid component into a liquid.

5. The process of claim 4, said step of discharging further comprising:
    passing the liquid into the sludge.

6. The process of claim 4, said step of discharging comprising:
    collecting the liquid for reuse.

* * * * *